April 21, 1959  I. W. RUDERMAN  2,883,550
DOUBLE WINDOW PHOSPHORS AND CIRCUITS THEREFOR
Filed Aug. 10, 1953  2 Sheets-Sheet 1
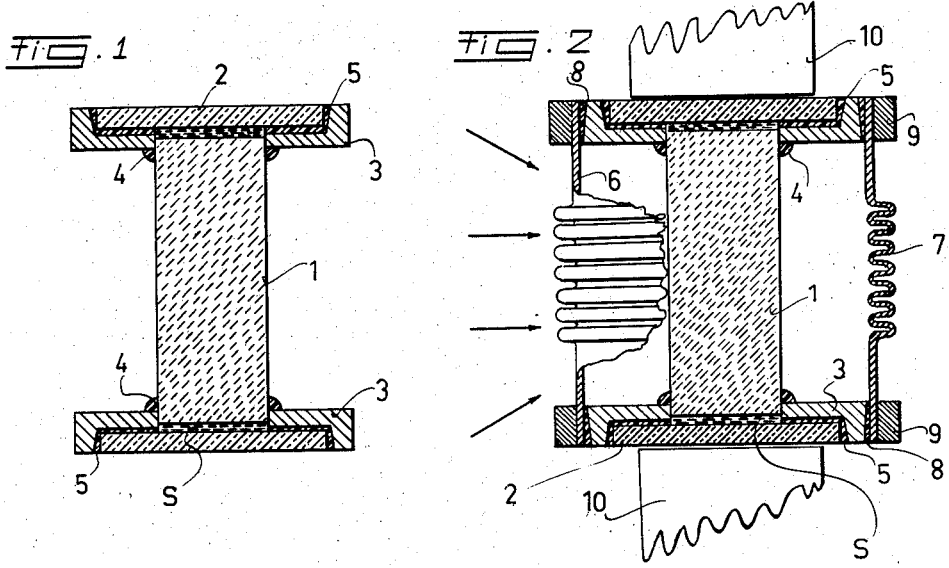
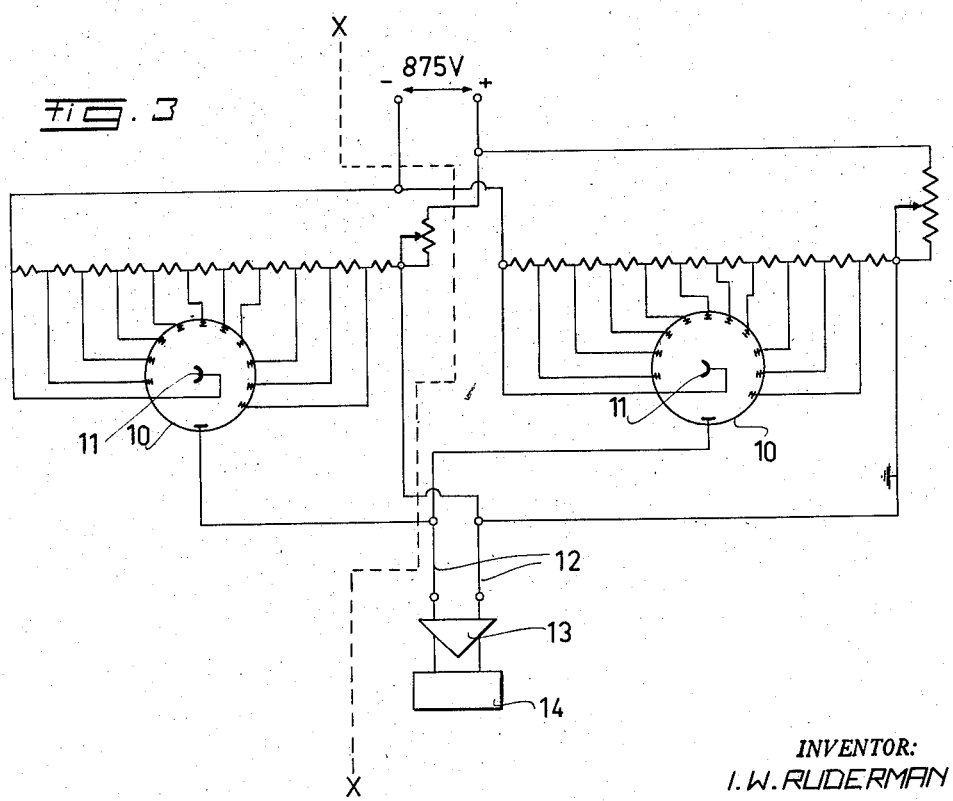
INVENTOR:
I. W. RUDERMAN
BY J. W. Schmied
ATTORNEY

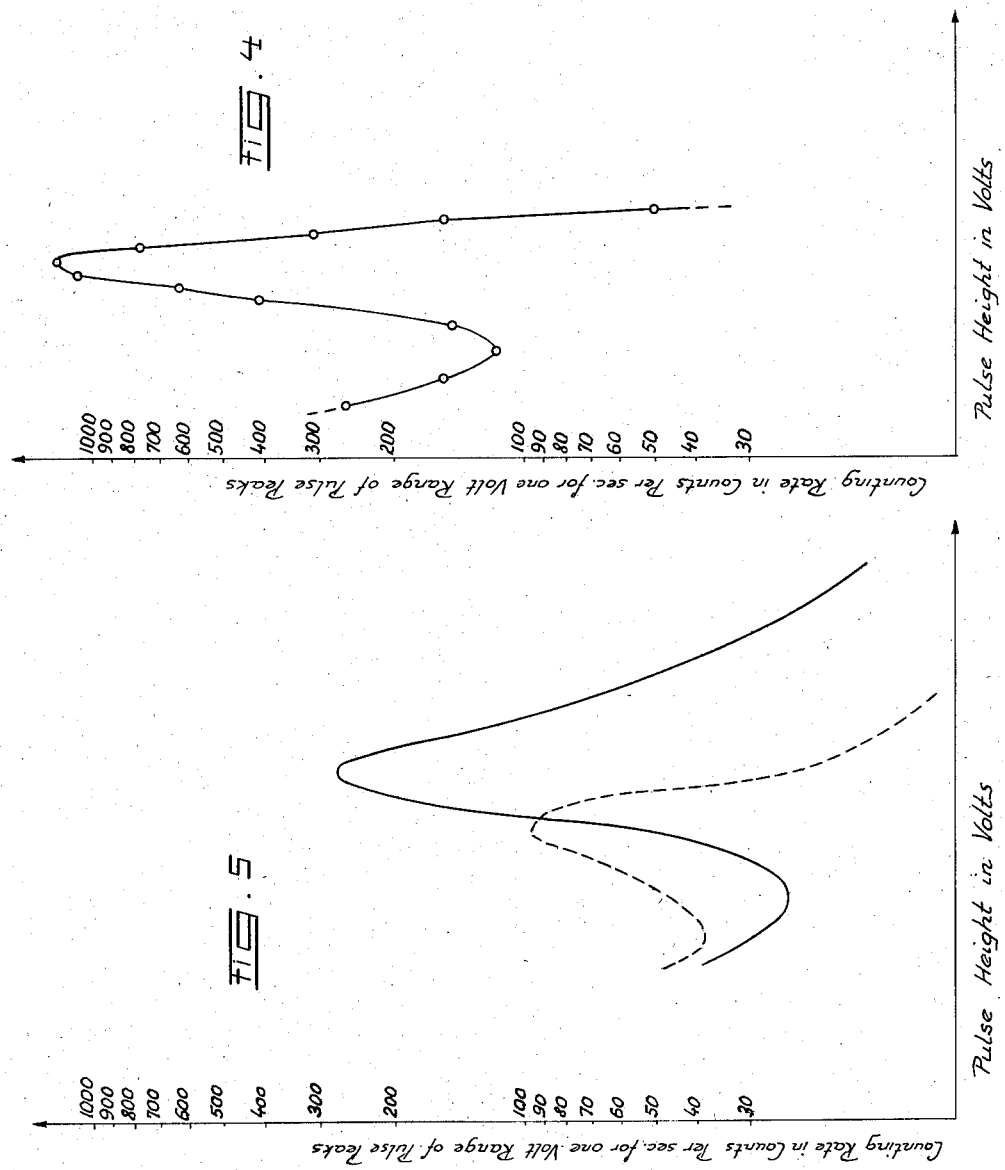

United States Patent Office 2,883,550
Patented Apr. 21, 1959

2,883,550

DOUBLE WINDOW PHOSPHORS AND CIRCUITS THEREFOR

Irving Warren Ruderman, New York, N.Y., assignor to Isomet Corporation, Palisades Park, N.J., a corporation of New Jersey Application August 10, 1953, Serial No. 373,082

5 Claims. (Cl. 250—79)

This invention relates to improvements in mounting and application of fluorescent scintillating crystals, commonly called phosphors, or equivalent devices, and more particularly relates to arrangements whereby the response of devices and circuits employing such crystals is amplified and made more uniform.

In a former type of device a phosphor was mounted in an interiorly reflective container of aluminum or other light metal equivalent for the purpose having a light transmissive window for coupling the phosphor to the photo-cathode of a photo-multiplier tube or equivalent photo-sensitive cathode. In such type of device the entrance of some unit of nuclear energy such as a gamma ray through the wall of the container to energize the phosphor could strike the phosphor at any part thereof. Hence, the resultant light—a word used herein as inclusive of a wide range of spectral radiation from and including the ultra-violet to and including the infra-red—would have paths of varying length to traverse and varying numbers of reflections to undergo before passing to and impinging upon the photo-cathode.

In accordance with the present invention two photo-cathode multiplier tubes are employed, each of which is coupled in an aiding manner in any desired or suitable way to an output detecting, counting or indicating device; thus if any given unit of light is produced in any part of the phosphor the sum of its effects on the two photo-cathodes will be nearly equal; if the light originates at the midpoint of the crystal, it will affect the two photo-cathodes substantially equally; if, however, it is far from one so that the radiation is somewhat dissipated in reaching it, it will be correspondingly near to the other and will produce a correspondingly greater effect thereupon so that the sum of the two effects will be about equal. Inasmuch as phosphors require coupling to a photo-tube through a window highly transmissive to light and because this can be accomplished by employing a coupling consisting of a high viscosity silicone of permanently viscous properties between the phosphor and the optical glass or equivalent i.e., poly-methyl-methacrylate, with no air spaces or bubbles between, or alternatively by a light transmissive cement, a problem has arisen in attempting to couple a crystal phosphor at both ends. Attempts to do this have achieved unsatisfactory results. I have discovered that a major cause of difficulty has been the unequal expansion of the can and phosphor. After definite failures of prior devices due to cleavage or splitting of the phosphors under the strain, or separation of the phosphor from the window I have found a solution to the problem by utilizing a container whose otherwise generally cylindrical surface consists wholly or partly of material having annular corrugations in the form of a bellows. The internal diameter is such that the phosphor may be first coupled to a window at each end, then passed into the bellows-like can and sealed therein with the usual precautions. By slightly expanding the bellows prior to sealing a small permanent pressure may be maintained to hold the phosphor crystal to its window. Thus, the discovery of this arrangement for a double windowed phosphor led to the observation that a bellows-like can may be used for a single phosphor bottomed on the inner end of the can opposite its window thus assisting in the solution of the problem of maintaining the integrity of the coupling by placing a light pressure on the glass of the window to hold it against the cement or coupling fluid and it, in turn, against the phosphor.

An exemplary embodiment of the invention is further to be described by reference to the accompanying drawings in which:

Fig. 1 illustrates a crystal phosphor having a window applied to each end in preparation for mounting in a can;

Fig. 2 is a cross-sectional view of the bellows-like can, with a part of one side not broken away, with the crystal mounted therein and showing somewhat diagrammatically the window ends of two photo-multiplier tubes of a conventional type applied to the coupling windows of the crystal; the arrows indicate possible directions and paths of incident gamma rays i.e. hard X-rays or equivalent ionizing radiation; and Fig. 3 illustrates in a highly schematic form a circuit connected to additively apply the pulse currents produced by the two multiplier photo-tubes to an amplifier and an indicator which are exemplary of any presently known form of output means or equivalents thereof.

Fig. 4 illustrates the variation in a typical case of the counting rate in counts per second as a function of the pulse heights in volts selected for counting, and Fig. 5 shows the actual improvement effected by the present invention, in the specific case of pulse counting, as compared with the prior art, the dotted curve representing the actual curve plotted to scale as furnished by a user of a prior art device and the solid line representing the actual curve plotted to the same scale as furnished by a user of the device as herein disclosed, the data for the points on each curve being averaged over an adequate time, and plotted on a scale similar to that of Fig. 4.

In producing a phosphor and window assembly according to the invention a phosphor 1, preferably in the form of an elongated cylinder, is provided with a window coupling 2 at each end so that the ends are symmetrical and identical, although identity of size of parts is not a necessary attribute of all forms of the invention, provided the available areas of the windows are substantially identical. Each end of the phosphor is fitted into a ring 3 of any suitable metal and cross section as shown. The space between the end of the phosphor 1 and the window 2 is completely filled with a permanent highly viscous liquid of good light transmitting properties i.e. a highly viscous layer S of silicone, for example. The window is applied to squeeze out excess silicone, if any, and cement rings 4 and 5 respectively seal the window 1, the ring 3, and the window 2 to the ring; also hermetically sealing the spaces occupied by the silicones. As previously stated when a double ended structure of this sort was sealed in an aluminum can, unsatisfactory results ensued. In accordance with the present invention, however, success has been achieved by the use of a circumferentially corrugated or bellows-like aluminum can or at least one so corrugated for a portion of its length. Such can 6 in this embodiment, must have its least internal diameter sufficient to allow the passage therethrough of a ring 3. With other acceptable modes of assembly and sealing this may not be essential. The assembly of Fig. 1 is inserted and the bellows 7 slightly expanded whereupon cement 8 seals the can 6 to the rings 3 at each end thus creating a slight pressure equivalent to that produced by a weight of a few ounces to hold the windows firmly to the crystal. The can 6 may be reinforced at its ends with rings 9, if desired. The photo-cathode windows of multiplier photo-cathode tubes 10 may now be applied to each window in a light tight manner with such precautions and with such means as have heretofore been practiced with single window assemblies. For phosphors 1 there may be used any one of a large number of organic or inorganic crystals activated by any one of a variety of activators and prepared by known methods such as alkali-halides activated with thallium, lead or tin. Many of these and other phosphors are technically available although not necessarily available on the market.

The can and the crystal may now expand or contract independently under the widely varying changes of temperature to which such devices may be subjected in transport or use, yet nevertheless the integrity of the light couplings, and of the phosphor itself is maintained.

One aspect of the invention therefore is a double window crystal phosphor which is practicable in the sense of being sufficiently durable to stand the vicissitudes of shipping and usage without impairment of the delicate crystal and associated light coupling windows.

The arrows to the left of Fig. 2 signify the directions and paths of radiant energy waves or particles penetrating the can 6 and acting upon the phosphor 1. For this purpose the walls of the can are appropriately thin and may be quite thin, e.g. $\frac{1}{10}$ to $\frac{1}{4}$ mm., more or less. The crystal generates light under the influence of this radiation, which may be produced in pulses if the radiation is applied in pulses. As will be seen the total response of both tubes 10 will be much more nearly uniform than has heretofore been the case with single window devices activating single multiplier photo-tubes or equivalent light sensitive electronic devices for producing outputs of current in the form of individual pulses under the control of increments of light. In prior practice one multiplier photo-tube circuit of the type shown above the dotted line X—X of Fig. 3 has been employed, the photo-sensitive cathode of the tube 10 being diagrammatically indicated at 11. Such and equivalent circuits have been commonly used and suitable tubes have been on the market for a decade or so. Although by no means the earliest disclosure of such a circuit, a full description is found in a copyrighted publication entitled RCA 5819 Multiplier Photo-tube, copyright 1949 in the U.S.A. by the Radio Corporation of America. A conventional D.C. power supply of 875 volts is indicated. To effectuate the purposes of the present invention two of the photo-tubes as shown are connected in parallel to the same or different power supplies with their photo-cathodes coupled to the respective windows 2, their circuits to the multiplier electrodes duplicated and their outputs connected in aiding relation in any desired manner to an output circuit 12, specifically, in the present case, in multiple. Amplifier 13 of any known conventional type and indicator 14, which may be a cathode ray tube, a pulse counter, or other known device or devices are conventionally indicated.

For special purposes incident to the practice of the invention the connections of the output circuits of tubes 10 to circuit 12 may be in parallel or series, may be capacitative or inductive, such as by impulse transformers, or the circuit 12 may include current wave form differentiators or integrators for modifying the current waves or pulses before their observation or useful application.

It is customary in the art to measure the uniformity of response of a scintillation crystal by obtaining a pulse height distribution curve for the crystal when the latter is exposed to a radioactive source emitting a monoenergetic particle or radiation. For example, the radioactive isotope $Cs^{137}$ emits a gramma ray having an energy of 669 K.e.v. and a sodium iodide thallium activated scintillation phosphor will give a pulse height distribution curve for $Cs^{137}$ such as shown in Fig. 4. The width of the curve at the half-maximum point divided by the pulse height at the peak expressed as a percentage is commonly called the resolution and is a good measure of a useful characteristic of the crystal as mounted and coupled. The ratio of the peak counting rate to the counting rate at the valley is a quantity that one desires to be as high as possible. A high peak-to-valley ratio and a low value for the resolution combine to give a crystal which can be used to separate out the complex radiation emitted by some radioactive species.

Fig. 5 shows pulse height distributions obtained with a mounted and hermetically sealed cylindrical LiI (Sn) crystal 1" in diameter and 6" long, and fitted with a transmissive window at each end, when exposed to thermal neutrons; i.e. neutrons of energy approximately 0.025 e.v. The dashed curve was obtained using only one window coupled to a single photo-multiplier tube. (The other window being blocked by a polished aluminum reflector.) The solid curve was obtained using two photo-multiplier tubes, one coupled to each window, with the outputs connected in parallel. The solid curve is seen to be much better both in resolution and peak-to-valley ratio.

Thus, there occur pulses susceptable of better resolution and thus more effective for their intended purpose, although the utility of double window phosphors is not limited to the specific application described.

An aspect of the invention therefore includes means for transducing light from the two windows of the crystal into currents or pulses which are added electrically to each other whereby a more uniform output than heretofore, and specifically whereby better resolution and peak-to-valley ratios may be achieved.

The embodiments both of the phosphor mounting and the electrical circuit as disclosed are exemplary rather than limiting.

What is claimed is:

1. A phosphor coupled through an inter-connecting medium to a light transmissive window, a casing surrounding the phosphor, a crimped or bellows-like portion included in the casing, said portion permitting free and independent expansion and contraction of the phosphor and casing and being slightly expanded to apply at all times a pressure to maintain said window under pressure toward said phosphor.

2. A double ended casing containing a phosphor and being according to claim 1, having two windows at opposite ends of the phosphor wherein both windows are maintained under pressure toward the phosphor at all times by the free expansion of the bellows-like portion despite widely different coefficients of expansion of the phosphor and casing.

3. A phosphor having light transmitting windows coupled to opposite faces thereof, said windows being sealed in a casing and said phosphor being sealed to and within said casing, said casing having at least one corrugation transverse to the line connecting said windows whereby said phosphor and casing are free to independently contract and expand in a direction along a line connecting said windows by variations in the angle or curve of said corrugation.

4. A phosphor enclosed in an interiorly light reflective casing of wall thin enough at least in parts to admit nuclear radiation or particles, light transmissive windows at opposite faces of said phosphor, light sensitive electronic tubes coupled to the respective windows each for creating an electro-motive force proportioned to the light energy emitted through its respective window, output circuits for said tubes, and a load circuit coupled to said output circuits to receive additively the sum of the instantaneous variations in current resulting from said electro-motive forces.

5. The combination of a phosphor in which light is adapted to be generated by incident nuclear radiation, said phosphor being of dimensions and constitution such that light flashes resultant from scintillations appearing in different portions thereof are unequally manifested at different faces of the phosphor, windows at opposite faces of the phosphor, transducing elements coupled to the windows for converting light to electrical currents, circuit connections for always additively combining the currents, whether they are equal or unequal and a load circuit including utilizing elements for the combined currents.

References Cited in the file of this patent

UNITED STATES PATENTS

| | | |
|---|---|---|
| 2,349,754 | Porter | May 23, 1944 |
| 2,389,935 | Rothstein | Nov. 27, 1945 |
| 2,508,772 | Pontecorvo | May 23, 1950 |
| 2,517,404 | Morton | Aug. 1, 1950 |
| 2,537,373 | Rosenberg | Jan. 9, 1951 |
| 2,550,107 | Coltman | Apr. 24, 1951 |
| 2,629,069 | LaRue | Feb. 17, 1953 |
| 2,711,482 | Goodman | June 21, 1955 |
| 2,730,626 | Varney | Jan. 10, 1956 |

OTHER REFERENCES

Optical Cement for Scintillation Use, by R. L. Shipp, from Review of Scientific Instruments, vol. 23, No. 12, December 1952.